United States Patent
Hamada et al.

(10) Patent No.: US 10,291,396 B2
(45) Date of Patent: May 14, 2019

(54) DEVICE, METHOD AND PROGRAM FOR DETECTING POSITIONS OF PARTIAL CHARACTER STRINGS

(71) Applicant: NIPPON TELEGRAPH AND TELEPHONE CORPORATION, Chiyoda-ku (JP)

(72) Inventors: Koki Hamada, Musashino (JP); Dai Ikarashi, Musashino (JP); Naoto Kiribuchi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 89 days.

(21) Appl. No.: 15/515,650

(22) PCT Filed: Oct. 5, 2015

(86) PCT No.: PCT/JP2015/078185
§ 371 (c)(1),
(2) Date: Mar. 30, 2017

(87) PCT Pub. No.: WO2016/056503
PCT Pub. Date: Apr. 14, 2016

(65) Prior Publication Data
US 2017/0302442 A1 Oct. 19, 2017

(30) Foreign Application Priority Data
Oct. 8, 2014 (JP) .................................. 2014-206943

(51) Int. Cl.
*H04K 1/00* (2006.01)
*H04L 9/06* (2006.01)
(Continued)

(52) U.S. Cl.
CPC ...... *H04L 9/0643* (2013.01); *G06F 16/90344* (2019.01); *G06F 17/30985* (2013.01); *G09C 1/00* (2013.01); *H04L 2209/46* (2013.01)

(58) Field of Classification Search
USPC ......................................................... 380/28
See application file for complete search history.

(56) References Cited

U.S. PATENT DOCUMENTS 6,246,769 B1 * 6/2001 Kohut .................. G06Q 20/341
380/45
7,995,764 B2 * 8/2011 Schneider ............... H04L 9/085
380/277
(Continued)

OTHER PUBLICATIONS

International Search Report dated Dec. 1, 2015 in PCT/JP2015/078185 filed Oct. 5, 2015.
(Continued)

*Primary Examiner* — Amare F Tabor
(74) *Attorney, Agent, or Firm* — Oblon, McClelland, Maier & Neustadt, L.L.P.

(57) ABSTRACT

The positions in a text in which partial character strings in a pattern appear are efficiently detected. A partial-character-string position detecting device 1 takes inputs of a secret text [t] of a text t, a secrete text <p> of a pattern p, a secret text <c> of a vector c, and a secret text <E> of a matrix E and outputs a secret text <H> of a matrix H. A first matrix generating part 20 generates a secret text <F> of a matrix F, in which $F[i][j]=E[i][j+i \bmod n+1]$ (where it is assumed that $E[i][n]=\neg c[i]$). A second matrix generating part 30 generates a secret text <F'> of a matrix F', in which $F'[i][j]=1$ is set if $c[i]=0$ or if $c[i]=1$ and $F[k][j]=1$ for every k that is successively $c[k]=1$, otherwise $F[i][j]=0$ is set, where $k=i,\ldots,n-1$. A third matrix generating part 40 computes $<H[i][j]>=<F[i][j-i \bmod n+1]> \wedge <c[i]> \wedge \neg <c[i-1]>$ to generate the secrete text <H>.

5 Claims, 2 Drawing Sheets

(51) Int. Cl.
*G06F 16/903* (2019.01)
*G09C 1/00* (2006.01)
*G06F 17/30* (2006.01)

(56) References Cited

U.S. PATENT DOCUMENTS

| | | | | |
|---|---|---|---|---|
| 9,106,407 B2* | 8/2015 | Kipnis | ............... | H04L 9/085 |
| 9,613,292 B1* | 4/2017 | El Defrawy | ......... | G06K 9/6201 |
| 2008/0141363 A1* | 6/2008 | White | ............... | G07F 7/10 |
| | | | | 726/18 |
| 2015/0349966 A1* | 12/2015 | Dimitrakos | ........... | H04L 9/3271 |
| | | | | 713/168 |

OTHER PUBLICATIONS

Chida, Koji et al., "A Three-Party Secure Function Evaluation with Lightweight Verifiability Revisited," CSS2010, 2010, 6 pages.
Damgard, Ivan et al., "Unconditionally Secure Constant-Rounds Multi-Party Computation for Equality, Comparison, Bits and Exponentiation," TCC, 2006, pp. 285-304.
Ladner, Richard E. et al., "Parallel Prefix Computation," J. ACM, vol. 27, No. 4, 1980, pp. 831-838.
Extended European Search Report dated May 9, 2018 in European Patent Application No. 15848972.4, citing documents AX and AY therein, 8 pages.
Chida, K., et al., "A Lightweight Three-party Secure Function Evaluation with Error Detection and Its Experimental Result", IPSJ, vol. 52 No. 9, XP055471460. Sep. 1, 2011, pp. 2674-2685 (with English abstract).
Baron, J., et al., "5PM: Secure Pattern Matching", Security and Cryptography for Networks, XP047016101, 2012, pp. 222-240.

\* cited by examiner

DEVICE, METHOD AND PROGRAM FOR DETECTING POSITIONS OF PARTIAL CHARACTER STRINGS

TECHNICAL FIELD

The present invention relates to a cryptography applied technique and, in particular, to a technique for detecting the positions in a text in which partial character strings contained in a pattern appear without revealing input data.

BACKGROUND ART

There is a method, called secure computation, for obtaining computational results without decrypting encrypted numerical values (see Non-patent literature 1, for example). In the method in Non-patent literature 1, encryption is performed that distributes pieces of a numerical value are distributed among three secure computers and the three secure computers cooperate to perform a computation, thereby enabling the result of an addition, subtraction, addition by a constant, multiplication, multiplication by a constant, or logical operation (negation, AND, OR, or exclusive-OR) or data format conversion (integer, binary) to be held in such a manner that the result is distributed among the three secure computers without reconstructing the numerical value, that is, with the result being kept encrypted.

When pattern matching of character strings is performed, it is common practice to locate the positions in which the partial character strings included in a pattern appear in a text and determine whether the text matches the pattern on the basis of information about the positions.

PRIOR ART LITERATURE

Non-Patent Literature

Non-patent literature 1: Koji Chida, Koki Hamada, Dai Ikarashi, Katsumi Takahashi: "A three-party secure function evaluation with lightweight verifiability revisited", CSS, 2010

SUMMARY OF THE INVENTION

Problems to be Solved by the Invention

However, to locate the positions of partial character strings by secure computation, the contents of the text and the pattern need to be concealed while the processing. Accordingly, pattern matching performed in a simple manner requires $O(1)$ rounds and a communication amount of $\Omega(m^3 n)$, where n is the input text length and in is the pattern length.

An object of the present invention is to efficiently detect positions in which partial character strings included in a pattern appear in a text in pattern matching.

Means to Solve the Problems

To solve the problem, a partial-character-string position detecting device according to the present invention takes inputs of a secret text $<t>$ of a text t having a length of n, a secret text $<p>$ of a pattern p having a length of m, a secret text $<c>$ of a vector c having a length of m, and a secret text $<E>$ of a matrix of in rows and n columns and outputs a secret text $<H>$ of a matrix H of m rows and n columns. $p[i]$ is an i-th element of the pattern p, $t[i]$ is an i-th element of the text t, $c[i]$ is an i-th element of the vector c, $E[i][j]$ is an element in an i-th row of a j-th column of the matrix E, $H[i][j]$ is an element in an i-th row of a j-th column of the matrix H. In the vector c, $c[i]=1$ is set if $p[i]$ is not a limitless gap representing a character string having an arbitrary length, otherwise, $c[i]=0$ is set. In the matrix E, $E[i][j]=1$ is set if $c[i]=0$ or $p[i]=t[j]$, otherwise, $E[i][j]=0$ is set. In the matrix H, $H[i][j]=1$ is set if $p[i]$ is the leading element of a partial character string resulting from separating the pattern p by the limitless gap and the partial character string appears in the j-th position in the text t, otherwise, $H[i][j]=0$ is set. A first matrix generating part generates a secret text $<F>$ of a matrix of in rows and (n+1) columns in which $F[i][j]=E[i][j+i \bmod n+1]$, where it is assumed that $E[i][n]=\neg c[i]$. A second matrix generating part generates a secret text $<F'>$ of a matrix $F'$ of m rows and (n+1) columns, wherein, in the secret text $<F'>$, $F[i][j]=1$ is set if $c[i]=0$ or if $c[i]=1$ and $F[k][j]=1$ for every k that is successively $c[k]=1$ when k is incremented by 1 from i, otherwise, $F[i][j]=0$ is set. A third matrix generating part computes $<H[i][j]>=<F[i][j-i \bmod n+1]> \wedge <c[i]> \wedge \neg <c[i-1]>$ to generate the secrete text $<H>$.

Effects of the Invention

The partial character string position detecting technique according to the present invention is capable of detecting the positions in which partial character strings included in a pattern appear in a text in $O(\log in)$ rounds with a communication amount of $O(mn)$ when results of character-by-character matching between the text and the pattern are given. Accordingly, the positions in which partial character strings in the pattern appear in the text can be efficiently detected in pattern matching.

DETAILED DESCRIPTION OF THE EMBODIMENTS

Figure 1:
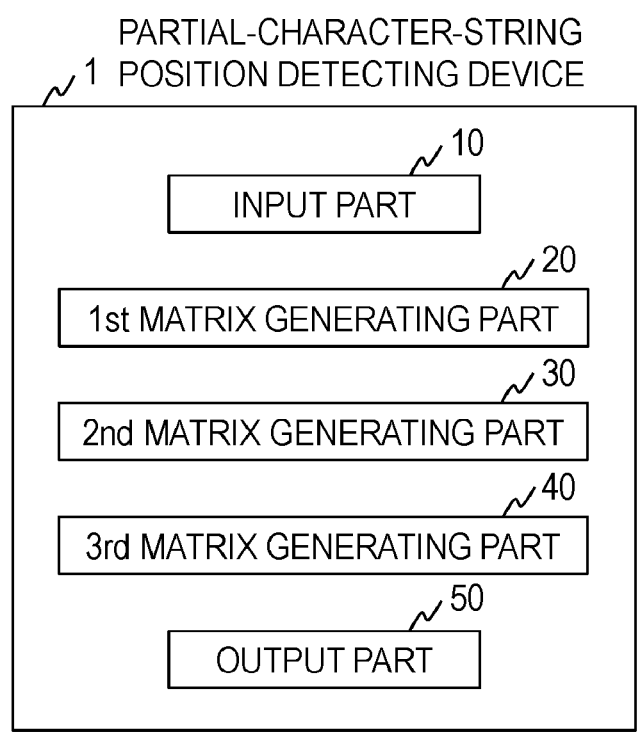
FIG. 1 is a diagram illustrating a functional configuration of a partial-character-string position detecting device.

Before describing embodiments, notation and the definitions of terms used herein will be given.

<Notation>

A value "a" concealed by encryption or secret sharing is referred to as a secret text of "a" and denoted as $<a>$. If secret sharing is used for concealment, a set of pieces of a shared secret held by secure computing devices is referred to by $<a>$.

The i-th row of a matrix X is denoted by $X[i]$. The i-th element of a vector u is denoted by $u[i]$. A whole matrix resulting from concealing the elements of a matrix X is denoted by $<X>$ and is referred to as a secret text of X. A whole vector resulting from concealing the elements of a vector "u" is denoted by $<u>$ and referred to as a secret text of "u".

$\bullet^T$ denotes the transpose of $\bullet$.

<Addition, Subtraction, Multiplication>

Addition, subtraction and multiplication take inputs of secret texts $<a>$, $<b>$ of two values a, b and yield secret texts $<c_1>$, $<c_2>$ and $<c_3>$, respectively, as the results of the computations, a+b, a−b, and ab, respectively. The executions of the operations are written as follows:

$<c_1> \leftarrow \text{Add}(<a>,<b>)$, $$<c_2> \leftarrow \text{Sub}(<a>,<b>),$$

$$<c_3> \leftarrow \text{Mul}(<a>,<b>) \quad \text{[Formula 1]}$$

Note that when there is no risk of misunderstanding, Add (<a>, <b>), Sub (<a>, <b>) and Mul (<a>, <b>) are simply denoted as <a>+<b>, <a>−<b> and <a>×<b>, respectively.

<Logical Operations>

Logical OR, logical AND, and negation operations take inputs of secret texts <a>, <b> of two values a, b∈{0, 1} and yield secret texts <$c_1$>, <$c_2$> and <$c_3$>, respectively, of the results $c_1$, $c_2$, and $c_3$ of logical OR of "a" and "b", logical AND of "a" and "b" and negation of "a", respectively. The executions of the operations are written as follows:

$$<c_1> \leftarrow <a> \lor <b>,$$

$$<c_2> \leftarrow <a> \land <b>,$$

$$<c_3> \leftarrow \neg <a> \quad \text{[Formula 2]}$$

The logical operations are accomplished by computations of the following formulas:

$$<c_1> \leftarrow <a>+<b>-<a>\times<b>,$$

$$<c_2> \leftarrow <a>\times<b>,$$

$$<c_3> \leftarrow 1-<a> \quad \text{[Formula 3]}$$

<Equality Testing>

Equality testing operations take inputs of secret texts <a>, <b> of two values a, b and yields secret texts <$c_1$>, <$c_2$> of truth values $c_1$, $c_2$, of a=b, a≠b, respectively. A truth value of 1 represents true and a truth value of 0 represents false.

The executions of the operations are written as follows.

$$<c_1> \leftarrow (<a> \stackrel{?}{=} <b>),$$

$$<c_2> \leftarrow (<a> \neq <b>) \quad \text{[Formula 4]}$$

Concealment, reconstruction, addition, subtraction and multiplication may be accomplished using methods described in Non-patent literature 1. Equality testing may be accomplished using a method described in Ivan Damgard, Matthias Fitzi, Eike, Kitz, Jesper Buus Nielsen and Tomas Toft, "Unconditionally secure constant-rounds multi-party computation for equality, comparison, bits and exponentiation", TCC, pp. 285-304, 2006 (Reference Literature 1).

<Pattern Matching>

Pattern matching is the problem of, given two character strings, i.e. a text t and a pattern, determining whether or not the text t matches a condition described in the pattern p. The text t is a vector in which 0 or more elements of an alphabet Σ={a, b, c, . . . , z} are arranged. The pattern p is a vector that consists of 0 or more alphabetical characters or special symbols. The special symbols include special symbols such as "?" and "*" used in the command LIKE in SQL, which is a language for database operations, and in many shells, which are languages for operating system (OS) software operations. The former special symbol "?" is a special symbol representing any single alphabetic character and is called a wildcard. The latter special symbol "*" is a special symbol representing an alphabetic character string of an arbitrary length greater than or equal to 0 and called a limitless gap. A text t matches a pattern p if the text t is included in a set of character strings that can be represented by the pattern p.

For example, let a pattern p be p=(a, b, ?, a, b, *). The pattern p can represent $t_0$=(a, b, c, a, b) and $t_1$=(a, b, a, a, b, x, x) but cannot represent $t_2$=(a, b, a, b, a). Therefore, the former two texts $t_0$ and $t_1$ matches the pattern p but the latter text $t_2$ does not match the pattern p.

A popular method of such pattern matching is to consider a pattern to be an arrangement of partial character strings separated by limitless gaps, compute the positions in which the partial character strings appear in a text, and use information about the positions to determine whether the text matches the pattern.

Partial character strings $s_0$, . . . , $s_{k-1}$ (si[i]∈(ΣU[?])), which is a pattern p separated by a limitless gap "*", is considered to be vectors coupled by a limitless gap "*". Here, k is the number of partial character strings in the pattern p. In this case, it is said that a partial character string $s_i$ appears in a position j in a text t if the following formula is satisfied.

$$(s_i[0]=p[j] \lor s_i[0]=?)$$

$$\land (s_i[1]=p[j+1] \lor s_i[1]=?)$$

$$\land \ldots \land (s_i[\lambda_i-1]=p[j+\lambda_i-1] \lor s_i[\lambda_i-1]=?) \quad \text{[Formula 5]}$$

Here, $\lambda_i$ is the size of the partial character string $s_i$.

For example, if a text t=(a, a, b, a, a, b, a) and a pattern p=(*, a, ?, *, b, *), the pattern p can be divided into two partial character strings (a, ?) and (b) by a limitless gap "*". Therefore, k=2, $s_0$=(a, ?) and $s_1$=(b). In this case, $s_0$=(a, ?) appears in positions j=0, 1, 3, 4 and $s_1$=(b) appears in positions j=2, 5.

Embodiments of the present invention will be described below in detail. Note that components that have like functions are given like reference numerals in drawings and repeated description of the components will be omitted.

As illustrated in FIG. 1, a partial-character-string position detecting device 1 according to an embodiment comprises an input part 10, a first matrix generating part 20, a second matrix generating part 30, a third matrix generating part 40 and an output part 50.

The partial-character-string position detecting device 1 is a special device configured by installing a special program into a well-known or dedicated computer comprising a central processing unit (CPU), a random access memory (RAM) and other components. The partial-character-string position detecting device 1 executes processes under the control of the CPU, for example. Data input into the partial-character-string position detecting device 1 and data obtained through the processes are stored in the RAM and the data stored in the RAM is read and used in other processes as needed, for example.

The partial-character-string position detecting device 1 takes inputs of a secret text <t> of a text having a length n, a secret text <p> of a pattern p having a length m, a secret text <c> of a vector c having a length m, and a secret text <E> of a matrix E of m rows and n columns, and outputs a secret text <H> of a matrix H of m rows and n columns.

In the vector c, c[i]=1 is set if p[i] is not a limitless gap representing a character string having an arbitrary length, otherwise, c[i]=0 is set. Here, p[i] is the i-th element of the pattern p and c[i] is the i-th element of the vector c.

In the matrix E, E[i][j]=1 is set if c[i]=0 or p[i]=t[j], otherwise, E[i][j]=0 is set. Here, t[i] is the i-th element of the text t. E[i][j] is an element in the i-th row of the j-th column of matrix E.

In the matrix H, H[i][j]=1 is set if p[i] is the leading element of a partial character string $s_\lambda$ resulting from separating the pattern p by a limitless gap and the partial character string $s_\lambda$ appears in the j-th position in the text t, otherwise, H[i][j]=0 is set. Here, H[i][j] is an element in the i-th row of the j-th column of matrix H. Here, $\lambda$ is an index of a partial character string and $\lambda=0, \ldots, L-1$, assuming that there are L partial character strings into which the pattern p is separated by limitless gaps.

Figure 2:
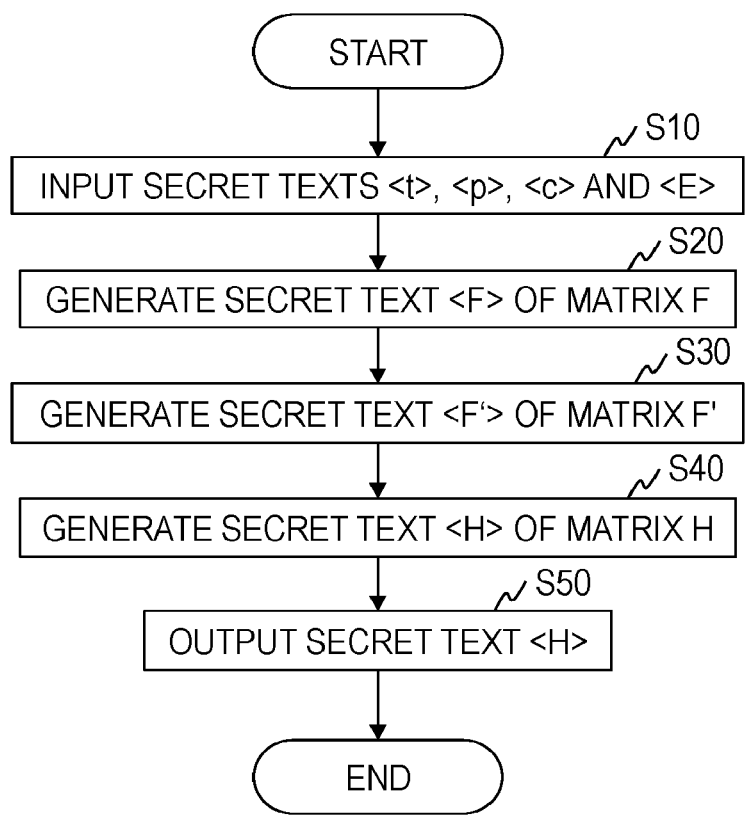
FIG. 2 is a diagram illustrating a process flow of a method for detecting positions of partial character strings.

A method for detecting the positions of partial character strings according to an embodiment will be described with reference to FIG. 2.

At step S10, a secret text $<t>$ of a text t, a secret text $<p>$ of a pattern p, a secret text $<c>$ of a vector c, and a secret text $<E>$ of a matrix E are input into the input part 10.

At step S20, the first matrix generating part 20 generates a secret text $<F>$ of a matrix F of m rows and (n+1) columns in which F[i][j]=E[i][j+i mod n+1] (where it is assumed that E[i][n]=¬c[i]). The matrix F is a matrix E having $\neg c^T$ coupled to the last row and being shifted to the left by i in the i-th row, where i=0, ..., m−1.

At step S30, the second matrix generating part 30 generates a secret text $<F'>$ of a matrix F' of m rows and (n+1) columns in which F'[i][j]=1 is set if c[i]=0 or if c[i]=1 and F[k][j]=1 for every k that is successively c[k]=1 when k is incremented by 1 from i, otherwise, F[i][j]=0 is set.

The matrix F' may be generated as follows. Let $e_j$ denote the j-th column vector of the matrix F. Vector c and the vector $e_j$ are used to generate a vector $e'_j$ as follows. In the vector $e'_j$, $e'_j[i]=1$ is set if $c[i]=0 \lor (c[i]=1 \land (e_j[k]=1$ for all successive k that satisfies c[k]=1 at and succeeding c[i])), otherwise, $e'_j[i]=0$ is set. The matrix F' is generated as F'[i][j]=$e'_j[i]$ by using the vector $e'_j$.

A specific method for computing the vector $e'_j$ is as follows.

First, consider a binary operation defined by the following formula.

$$\oplus \quad \text{[Formula 6]}$$

$$(x_1, f_1) \oplus (x_2, f_2) := (x_1 \land x_2, f_1 \land (\neg x_1 \lor f_2)) \quad \text{[Formula 7]}$$

pi:=(c[i],$e_j$[i]) is defined and the first element $S_i$[0] of $S_i$ computed according to the following formula is set as $e'_j$[i]. This allows a vector e'j that satisfies the condition given above to be generated.

$$S_i := ((((p_i \oplus p_{i+1}) \oplus p_{i+2}) \oplus p_{i+3}) \ldots) \oplus p_{m-1}) \quad \text{[Formula 8]}$$

Using coupling nature of the binary operation $$\oplus, \quad \text{[Formula 9]}$$

an approach described in Richard E. Ladner and Michael J. Fischer, "Parallel prefix computation", J. ACM, vol. 27, no. 4, pp. 831-838, 1980 (Reference literature 2)" can be used. The approach described in Reference literature 2 changes an order relation of a binary operation to increase the efficiency of computation. Using this approach, $S_1, \ldots, S_{m-1}$ can be computed with binary operations with O(m) times and O(log m) rounds and therefore the vector $e'_j$ can be more efficiently computed.

At step S40, the third matrix generating part 40 computes $<H[i][j]> = <F'[i][j-1 \mod (n+1)]> \land <c[i]> \land \neg <c[i-1]>$ to generate a secret text $<H>$ of the matrix H.

At step S50, the output part 50 outputs the secret text $<H>$ of matrix H of m rows and n columns. The matrix H indicates that if j exists in the i-th row of the matrix H such that H[i][j]=1, a partial character string $s_\lambda$ is detected at the j-th position of the text t, where p[i] is the leading element of the partial character string $s_\lambda$ in the pattern p.

An example will be used to show that the positions of partial character strings can be detected using the method described above.

For example, assume that a text t, a pattern p, a vector c and a matrix E given below are input at step S10.

$$t = (a, a, b, a, b, a, b, b, a, b), \quad \text{[Formula 10]}$$

$$p^T = \begin{pmatrix} * \\ a \\ b \\ * \\ ? \\ b \\ * \end{pmatrix}, c^T = \begin{pmatrix} 0 \\ 1 \\ 1 \\ 0 \\ 1 \\ 1 \\ 0 \end{pmatrix},$$

$$E = \begin{pmatrix} 1 & 1 & 1 & 1 & 1 & 1 & 1 & 1 & 1 & 1 \\ 1 & 1 & 0 & 1 & 0 & 1 & 0 & 0 & 1 & 0 \\ 0 & 0 & 1 & 0 & 1 & 0 & 1 & 1 & 0 & 1 \\ 1 & 1 & 1 & 1 & 1 & 1 & 1 & 1 & 1 & 1 \\ 1 & 1 & 1 & 1 & 1 & 1 & 1 & 1 & 1 & 1 \\ 0 & 0 & 1 & 0 & 1 & 0 & 1 & 1 & 0 & 1 \\ 1 & 1 & 1 & 1 & 1 & 1 & 1 & 1 & 1 & 1 \end{pmatrix}$$

In this example, n=10 and m=7.
At step S20, a matrix F given below is generated.

$$F = \begin{pmatrix} 1 & 1 & 1 & 1 & 1 & 1 & 1 & 1 & 1 & 1 \\ 1 & 0 & 1 & 0 & 1 & 0 & 0 & 1 & 0 & 0 & 1 \\ 1 & 0 & 1 & 0 & 1 & 1 & 0 & 1 & 0 & 0 & 0 \\ 1 & 1 & 1 & 1 & 1 & 1 & 1 & 1 & 1 & 1 \\ 1 & 1 & 1 & 1 & 1 & 0 & 1 & 1 & 1 & 1 \\ 0 & 1 & 1 & 0 & 1 & 0 & 0 & 0 & 1 & 0 & 1 \\ 1 & 1 & 1 & 1 & 1 & 1 & 1 & 1 & 1 & 1 \end{pmatrix} \quad \text{[Formula 11]}$$

At step S30, a matrix F' given below is generated.

$$F' = \begin{pmatrix} 1 & 1 & 1 & 1 & 1 & 1 & 1 & 1 & 1 & 1 \\ 1 & 0 & 1 & 0 & 1 & 0 & 0 & 1 & 0 & 0 & 0 \\ 1 & 0 & 1 & 0 & 1 & 1 & 0 & 1 & 0 & 0 & 0 \\ 1 & 1 & 1 & 1 & 1 & 1 & 1 & 1 & 1 & 1 \\ 0 & 1 & 1 & 0 & 1 & 0 & 0 & 0 & 1 & 0 & 1 \\ 0 & 1 & 1 & 0 & 1 & 0 & 0 & 0 & 1 & 0 & 1 \\ 1 & 1 & 1 & 1 & 1 & 1 & 1 & 1 & 1 & 1 \end{pmatrix} \quad \text{[Formula 12]}$$

At step S40, a matrix H given below is generated.

$$H = \begin{pmatrix} 0 & 0 & 0 & 0 & 0 & 0 & 0 & 0 & 0 & 0 \\ 0 & 1 & 0 & 1 & 0 & 1 & 0 & 0 & 1 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \\ 0 & 1 & 0 & 1 & 0 & 1 & 1 & 0 & 1 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \end{pmatrix} \quad \text{[Formula 13]}$$

For example, partial character strings (p[4], p[5])=(?, b) in a pattern p=(*, a, b, *, ?, b, *) appear at t[1]=(a, b), t[3]=(a, b), t[5]=(a, b), t[6]=(b, b), and t[8]=(a, b) in a text t=(a, a, b, a, b, a, b, b, a, b). It can be seen that in the matrix H, elements H[4][1], H[4][3], H[4][5], H[4][6], H[4][8] are 1 of the vector H[4]=(0 1 0 1 0 1 1 0 1 0) and the other elements are 0. In this way, the positions in which partial character strings in the pattern p appear can be detected by using the matrix H.

Effects of the Invention

The partial character string position detecting technique according to the present invention is capable of detecting the positions in which partial character strings included in a pattern appear in a text in O(log m) rounds with a communication amount of O(mn) when results of character-by-character matching between the text and the pattern are given.

Key Points of the Invention

According to the present invention, the positions in which partial character strings included in a pattern appear in a text are computed at once using the results of character-by-character matching, rather than computing the positions on a partial character sting-by-partial character string basis. Consequently, the processing that would require an amount of communication of $\Omega(m^3 n)$ if the positions are computed on a partial character string-by-partial character string basis can be accomplished with an amount of communication of O(mn).

It would be understood that the present invention is not limited to the embodiments described above and modifications can be made without departing from the spirit of the present invention. The operations described above may be performed not only in time sequence as is written but also in parallel or individually, depending on the throughput of the devices that perform the processes or requirements.

[Program and Recording Media]

If the processing functions of the devices described in the descriptions of the above embodiments are implemented by a computer, processing of the function that each device needs to include is described in a program. The program is executed on the computer to implement the processing functions described above on the computer.

The program describing the processing can be recorded on a computer-readable recording medium. The computer-readable recording medium may be any medium such as a magnetic recording device, an optical disc, a magneto-optical recording medium, and a semiconductor memory, for example.

The program may be distributed, for example, by selling, transferring, or lending portable recording media on which the program is recorded, such as DVDs or CD-ROMs. The program may be stored on a storage device of a server computer and transferred from the server computer to other computers over a network, thereby distributing the program.

A computer that executes the program first stores the program recorded on a portable recording medium or the program transferred from a server computer into a storage device of the computer. When the computer executes the processes, the computer reads the program stored in the storage device of the computer and executes the processes according to the read program. In another mode of execution of the program, the computer may read the program directly from a portable recording medium and may execute the processes according to the program or may execute the processes according to the program each time the program is transferred from the server computer to the computer. Alternatively, the processes may be executed using a so-called ASP (Application Service Provider) service in which the program is not transferred from a server computer to the computer but processing functions are implemented only by instructions to execute the program and acquisition of the results of the execution. It should be noted that the program in this mode comprises information that is made available for use in processing by an electronic computer and is equivalent to a program (such as data that is not direct commands to the computer but has the nature of defining processing performed by the computer).

While a given program is executed on a computer to configure the present device in this mode, at least part of the processes may be implemented by hardware.

What is claimed is:

1. A partial-character-string position detecting device taking secret inputs of a secret text <t> that conceals a text t having a length of n, a secret text <p> that conceals a pattern p having a length of m, a secret text <c> that conceals a vector c having a length of m, and a secret text <E> that conceals a matrix E of m rows and n columns and outputting a secret text <H> that conceals a matrix H of m rows and n columns, the matrix H being used for a determination on whether the text t matches the pattern p when performing pattern matching of character strings, the partial-character-string position detecting device comprising:

processing circuitry configured to
generate a secret text <F> of a matrix F of m rows and (n+1) columns in which F[i][j]=E[i][j+i mod n+1], where it is assumed that E[i][n]=¬c[i];
generate a secret text <F'> of a matrix F' of m rows and (n+1) columns, wherein, in the secret text <F'>, F[i][j]=1 is set if c[i]=0 or if c[i]=1 and F[k][j]=1 for every k that is successively c[k]=1 when k is incremented by 1 from i, otherwise, F[i][j]=0 is set; and
compute <H[i][j]>=<F[i][j−i mod n+1]>∧<c[i]>∧¬<c[i−1]> to generate the secrete text <H>;

wherein p[i] is an i-th element of the pattern p, t[i] is an i-th element of the text t, c[i] is an i-th element of the vector c, E[i][j] is an element in an i-th row of a j-th column of the matrix E, H[i][j] is an element in an i-th row of a j-th column of the matrix H;

in the vector c, c[i]=1 is set if p[i] is not a limitless gap representing a character string having an arbitrary length, otherwise, c[i]=0 is set;

in the matrix E, E[i][j]=1 is set if c[i]=0 or p[i]=t[j], otherwise, E[i][j]=0 is set; and in the matrix H, H[i][j]=1 is set if p[i] is the leading element of a partial character string resulting from separating the pattern p by the limitless gap and the partial character string appears in the j-th position in the text t, otherwise, H[i][j]=0 is set, wherein the secret inputs are electronic data received from at least one separate device which encrypts each of the text t, the pattern p, the vector c, and the matrix E, such that each of the text t, the pattern p, the vector c, and the matrix E always remain concealed from the partial-character-string position detecting device while the matrix H is generated.

2. The partial-character-string position detecting device according to claim 1, wherein $$\oplus \qquad \text{[Formula 14]}$$

is a binary operation defined by $$(x_1, f_1) \oplus (x_2, f_2) := (x_1 \wedge x_2, f_1 \wedge (\neg x_1 \vee f_2)) \text{ and } pi := (c[i], ej[i]); \text{ and} \qquad \text{[Formula 15]}$$

the processing circuitry sets $e'_j[i]$ as the first element of $S_i$, where $S_i$ is computed in accordance with the following formula:

$$S_i := ((((p_i \oplus p_{i+1}) \oplus p_{i+2}) \oplus p_{i+3}) \ldots ) \oplus p_{m-1}). \qquad \text{[Formula 16]}$$

3. A partial character string position detecting method, implemented by processing circuitry of a partial-character-string position detecting device, using as secret inputs of a secret text <t> that conceals a text t having a length of n, a secret text <p> that conceals a pattern p having a length of m, a secret text <c> that conceals a vector c having a length of m, and a secret text <E> that conceals a matrix E of m rows and n columns and outputting a secret text <H> that conceals a matrix H of m rows and n columns, the matrix H being used for a determination on whether the text t matches the pattern p when performing pattern matching of character strings, the partial-character-string position detecting method comprising:
- a first matrix generating step of generating, by a first matrix generating part, a secret text <F> of a matrix F of m rows and (n+1) columns in which F[i][j]=E[i][j+1 mod n+1], where it is assumed that E[i][n]=¬c[i];
- a second matrix generating step of generating, by a second matrix generating part, a secret text <F'> of a matrix F' of m rows and (n+1) columns, wherein, in the secret text <F'>, F[i][j]=1 is set if c[i]=0 or if c[i]=1 and F[k][j]=1 for every k that is successively c[k]=1 when k is incremented by 1 from i, otherwise, F[i][j]=0 is set; and
- a third matrix generating step of computing, by a third matrix generating part, <H[i][j]>=<F[i][j−i mod n+1]>∧<c[i]>∧¬<c[i−1]> to generate the secrete text <H>;

wherein p[i] is an i-th element of the pattern p, t[i] is an i-th element of the text t, c[i] is an i-th element of the vector c, E[i][j] is an element in an i-th row of a j-th column of the matrix E, H[i][j] is an element in an i-th row of a j-th column of the matrix H;

in the vector c, c[i]=1 is set if p[i] is not a limitless gap representing a character string having an arbitrary length, otherwise, c[i]=0 is set;

in the matrix E, E[i][j]=1 is set if c[i]=0 or p[i]=t[j], otherwise, E[i][j]=0 is set; and in the matrix H, H[i][j]=1 is set if p[i] is the leading element of a partial character string resulting from separating the pattern p by the limitless gap and the partial character string appears in the j-th position in the text t, otherwise, H[i][j]=0 is set, wherein the secret inputs are electronic data received from at least one separate device which encrypts each of the text t, the pattern p, the vector c, and the matrix E, such that each of the text t, the pattern p, the vector c, and the matrix E always remain concealed from the partial-character-string position detecting device while the matrix H is generated.

4. The partial-character-string position detecting method according to claim 3,
wherein ⊕ [Formula 17]

is a binary operation defined by $(x_1, f_1) \oplus (x_2, f_2) := (x_1 \wedge x_2, f_1 \wedge (\neg x_1 \vee f_2))$ and $pi := (c[i], ej[i])$; and [Formula 18]

the second matrix generating step sets $e'_j[i]$ as the first element of $S_i$, where $S_i$ is computed in accordance with the following formula:

$$S_i := ((((p_i \oplus p_{i+1}) \oplus p_{i+2}) \oplus p_{i+3}) \ldots ) \oplus p_{m-1}). \qquad \text{[Formula 19]}$$

5. A non-transitory computer readable medium including computer executable instructions that make a computer function as a partial-character-string position detecting device taking secret inputs of a secret text <t> that conceals a text t having a length of n, a secret text <p> that conceals a pattern p having a length of m, a secret text <c> that conceals a vector c having a length of m, and a secret text <E> that conceals a matrix E of m rows and n columns and outputting a secret text <H> that conceals a matrix H of m rows and n columns, the matrix H being used for a determination on whether the text t matches the pattern p when performing pattern matching of character strings, the partial-character-string position detecting device comprising:
processing circuitry configured to
- generate a secret text <F> of a matrix F of m rows and (n+1) columns in which F[i][j]=E[i][j+i mod n+1], where it is assumed that E[i][n]=¬c[i],
- generate a secret text <F'> of a matrix F' of m rows and (n+1) columns, wherein, in the secret text <F'>, F[i][j]=1 is set if c[i]=0 or if c[i]=1 and F[k][j]=1 for every k that is successively c[k]=1 when k is incremented by 1 from i, otherwise, F[i][j]=0 is set; and
- compute <H[i][j]>=<F[i][j−i mod n+1]>∧<c[i]>∧¬<c[i−1]> to generate the secrete text <H>;

wherein p[i] is an i-th element of the pattern p, t[i] is an i-th element of the text t, c[i] is an i-th element of the vector c, E[i][j] is an element in an i-th row of a j-th column of the matrix E, H[i][j] is an element in an i-th row of a j-th column of the matrix H;

in the vector c, c[i]=1 is set if p[i] is not a limitless gap representing a character string having an arbitrary length, otherwise, c[i]=0 is set;

in the matrix E, E[i][j]=1 is set if c[i]=0 or p[i]=t[j], otherwise, E[i][j]=0 is set; and in the matrix H, H[i][j]=1 is set if p[i] is the leading element of a partial character string resulting from separating the pattern p by the limitless gap and the partial character string appears in the j-th position in the text t, otherwise, H[i][j]=0 is set, wherein the secret inputs are electronic data received from at least one separate device which encrypts each of the text t, the pattern p, the vector c, and the matrix E, such that each of the text t, the pattern p, the vector c, and the matrix E always remain concealed from the partial-character-string position detecting device while the matrix H is generated.

* * * * *